United States Patent [19]

Beasley, Jr.

[11] Patent Number: 4,793,810

[45] Date of Patent: Dec. 27, 1988

[54] INTERACTIVE INSTRUCTIONAL APPARATUS AND METHOD

[75] Inventor: Eugene T. Beasley, Jr., Huntsville, Ala.

[73] Assignee: Data Entry Systems, Inc., Huntsville, Ala.

[21] Appl. No.: 932,259

[22] Filed: Nov. 19, 1986

[51] Int. Cl.[4] .............................................. G09B 11/04
[52] U.S. Cl. ........................................ 434/165; 434/85
[58] Field of Search ................. 434/85, 159, 162, 165, 434/335, 163; 382/13

[56] References Cited

U.S. PATENT DOCUMENTS

| | | |
|---|---|---|
| 3,487,371 | 12/1969 | Frank . |
| 3,676,848 | 7/1972 | Hall .................................... 382/13 |
| 3,909,785 | 9/1975 | Howells . |
| 4,024,500 | 5/1977 | Herbst et al. . |
| 4,211,018 | 7/1980 | DeVoid et al. . |
| 4,262,281 | 4/1981 | Buckle et al. . |
| 4,284,975 | 8/1981 | Odaka . |
| 4,464,118 | 8/1984 | Scott et al. . |
| 4,542,526 | 9/1985 | Satoh et al. . |
| 4,550,438 | 10/1985 | Convis et al. . |
| 4,561,105 | 12/1985 | Crane et al. . |

Primary Examiner—Jerry Smith
Assistant Examiner—Steven Kibby
Attorney, Agent, or Firm—Cushman, Darby & Cushman

[57] ABSTRACT

An interactive writing skills instructional apparatus includes a display device, such as an LCD panel, for displaying single or multi-stroke characters and an input digitizer for accepting user-entered characters that are representative of the displayed character. A program controller microprocessor grades the user-entered stroke or strokes by scanning the digitized representation of the user-entered stroke for extreme points, dividing the user-entered stroked into segments and then analyzing each segment in terms of the position of its start and end extreme points, segment orientations, curvature, relative position, direction drawn, and size. Deduction points are then assigned for deviations from the ideal value to yield a 'grade'. The user is provided with a indication of performance including both audio and visual indications as a function of the performance grade.

34 Claims, 15 Drawing Sheets

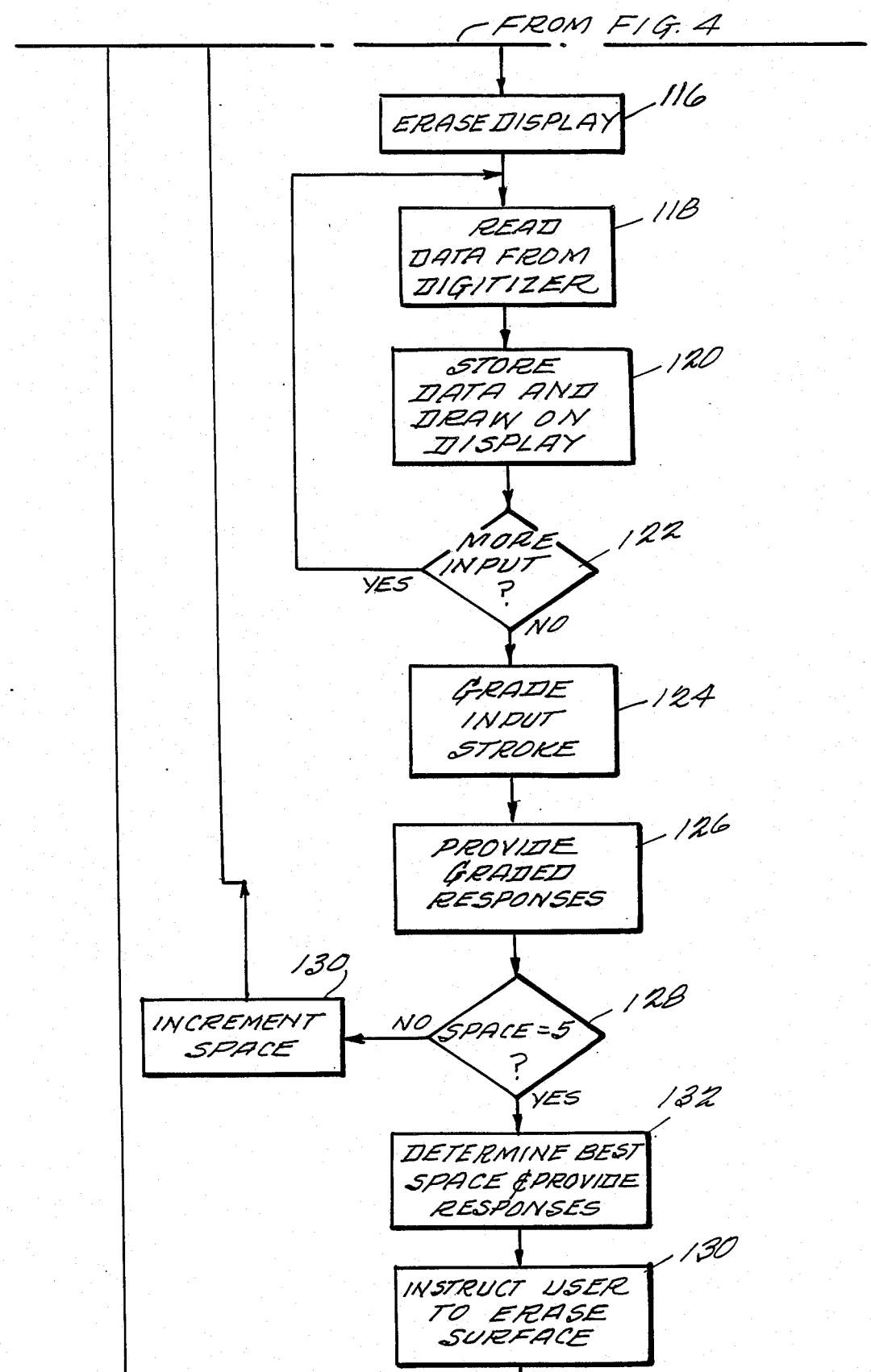

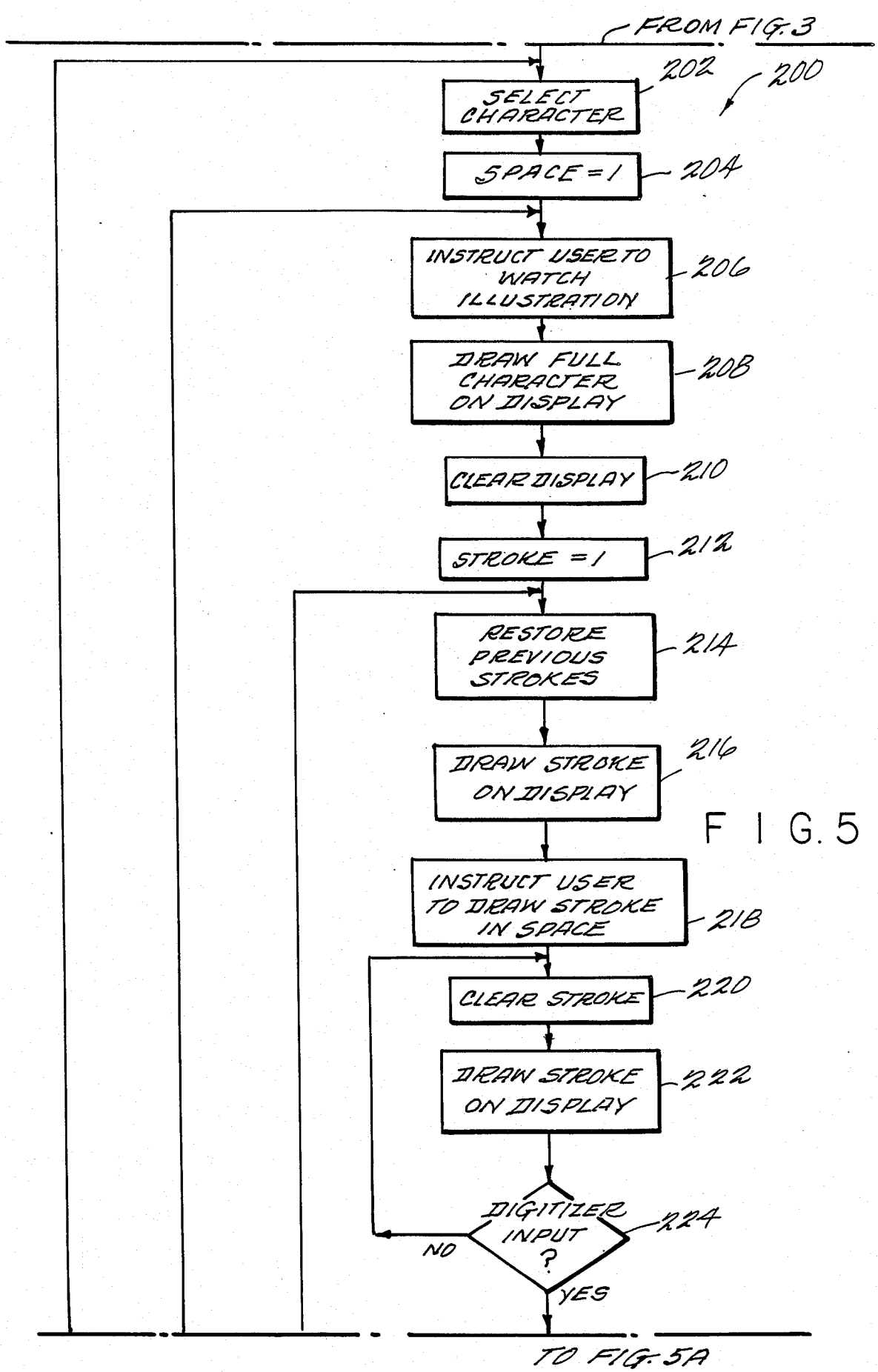

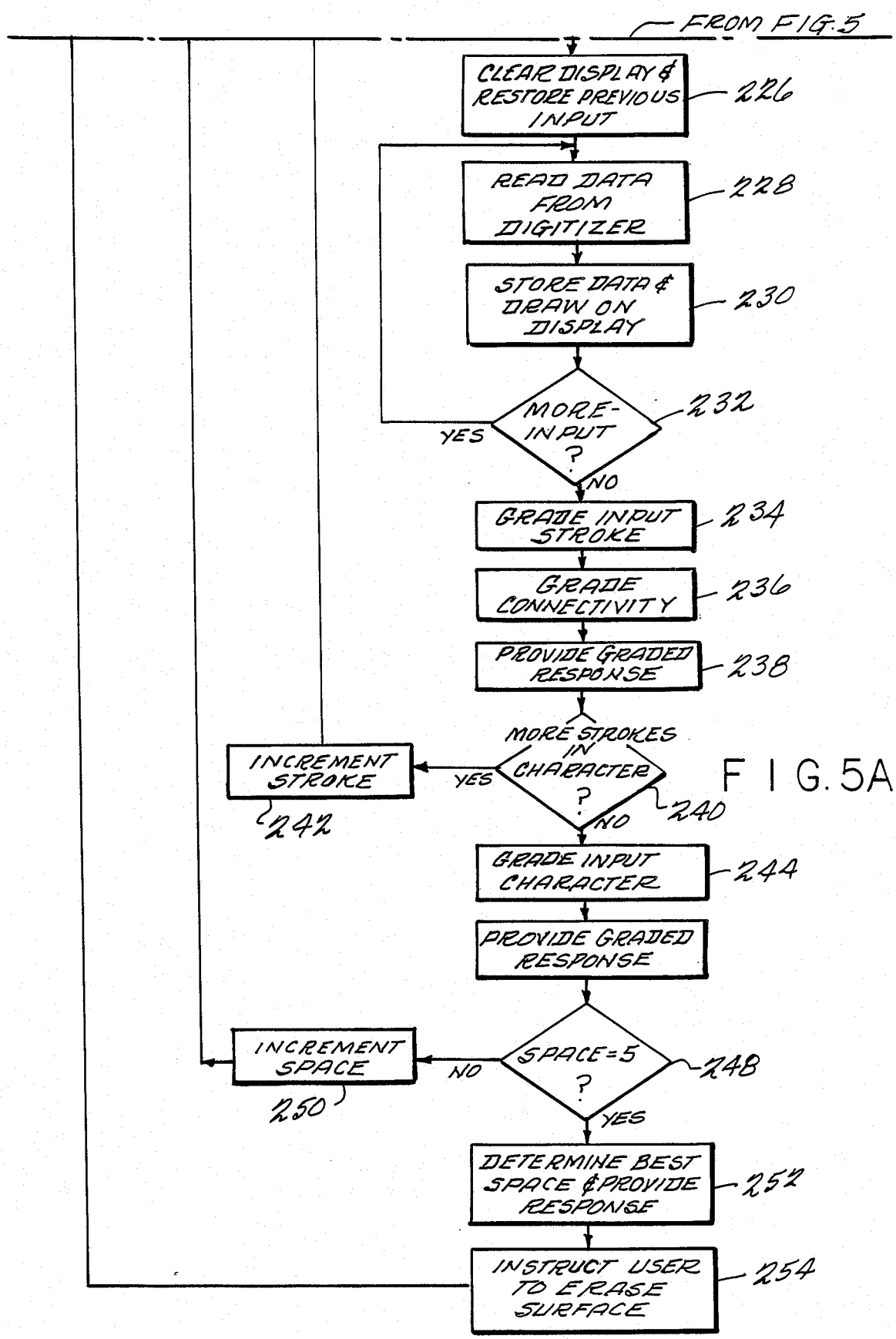

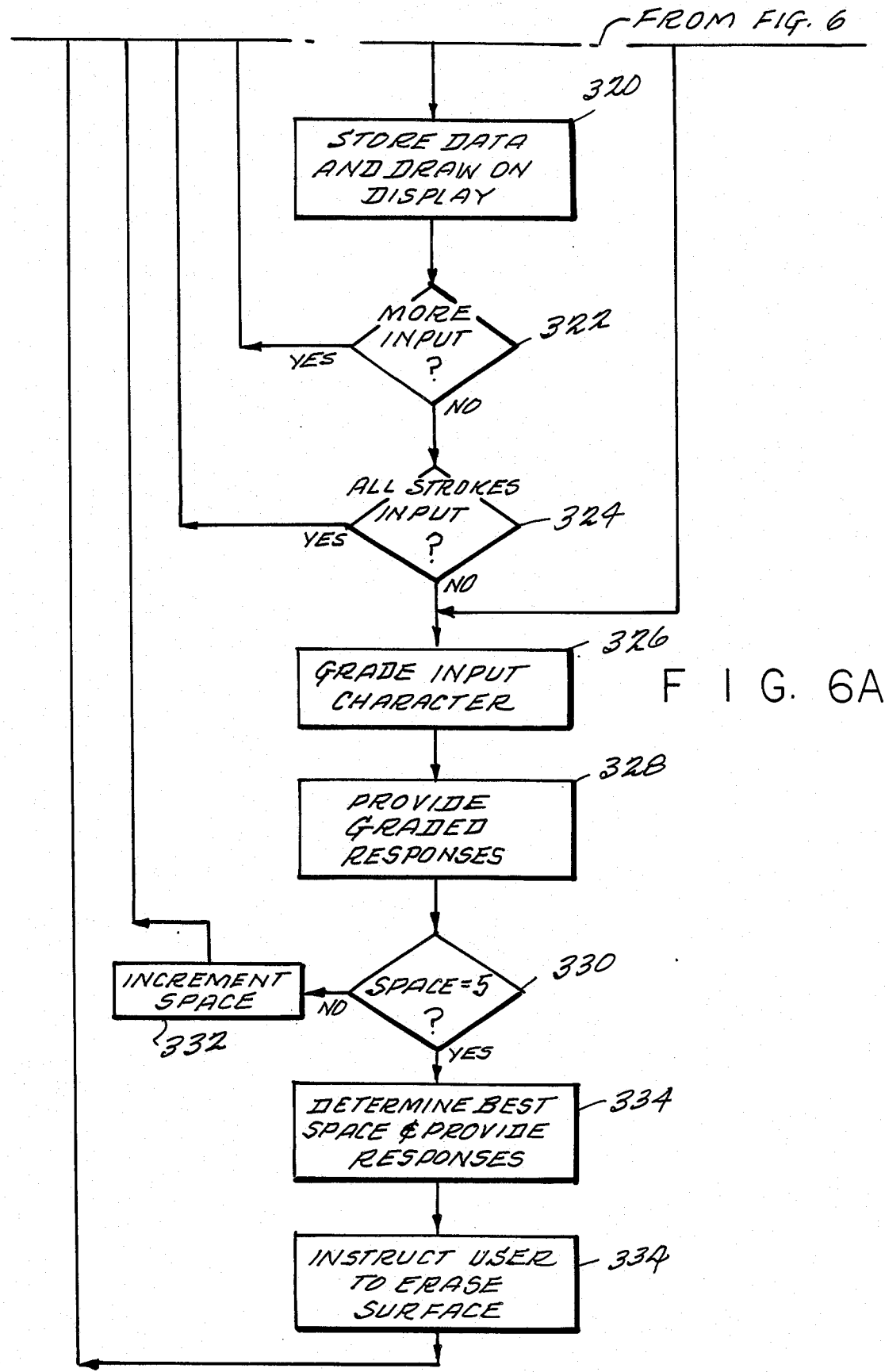

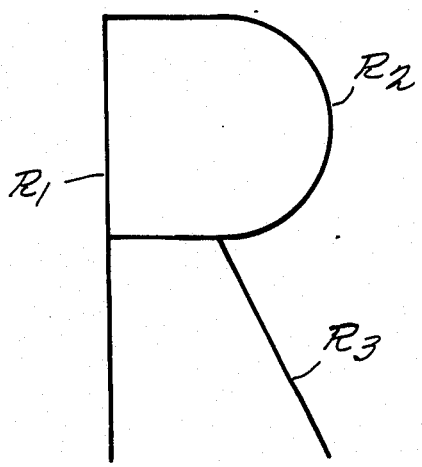
FIG. 11A
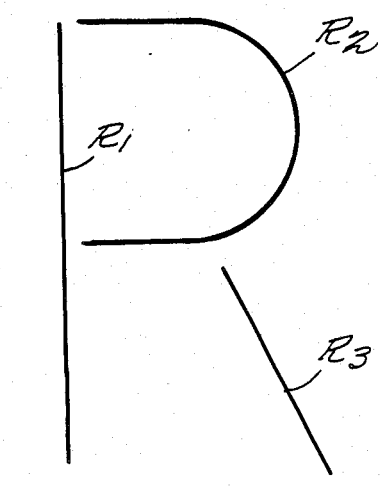
FIG. 11B
FIG. 11C
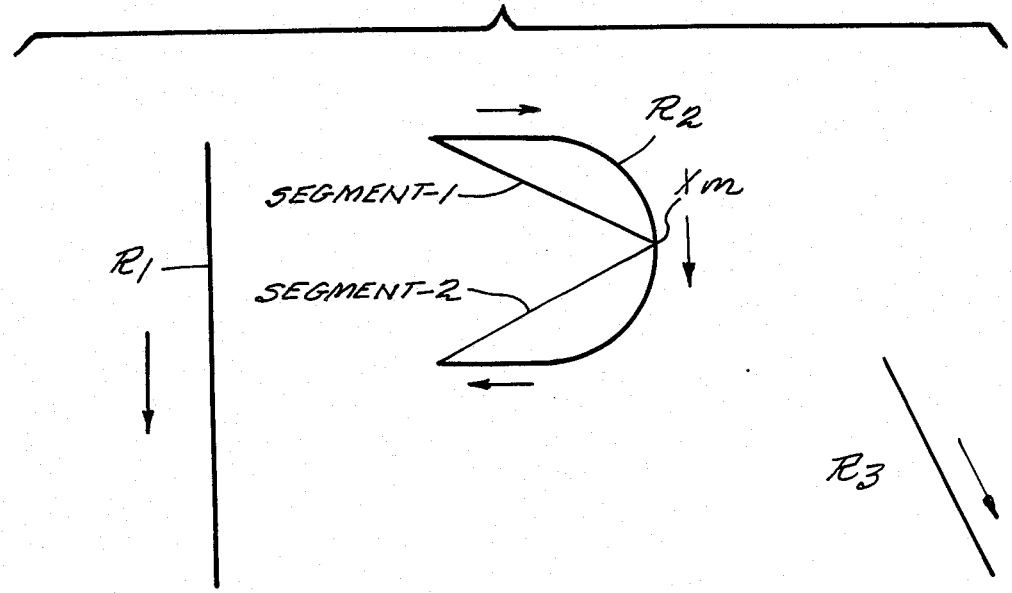

FIG. 13

| PARAMETER | IDEAL | INPUT | DEV. | DEDUCTION |
|---|---|---|---|---|
| SEGMENT 1 | | | | |
| Position of start | (5, 105) | (12, 105) | 7 | 2 |
| Position of end | (55, 30) | (50, 70) | 11.2 | 3 |
| Orientation | −30 deg. | −45 deg. | −15 | 2 |
| Curvature | −60 | −30 | −30 | 1 |
| SEGMENT 2 | | | | |
| Position of start | (55, 80) | (50, 70) | 11.2 | 3 |
| Position of end | (5, 55) | (5, 45) | 10 | 3 |
| Orientation | −150 deg. | −160 deg. | −10 | 1 |
| Curvature | −60 | −40 | −20 | 1 |
| STROKE CHARACTERISTICS | | | | |
| Direction drawn | + | − | − | 10 |
| Position in space | (145, 50) | (120, 30) | 25 | 2 |
| Size | 50 x 25 | 45 x 25 | 5 x 0 | 1 |
| | | Total Deduction = | | 29 |

INTERACTIVE INSTRUCTIONAL APPARATUS AND METHOD

BACKGROUND OF THE INVENTION

The present invention relates to apparatus for teaching and improving writing skills and, more particularly, to apparatus for teaching and improving stroke forming and character forming skills.

Educational and teaching machines have been developed for improving various skills, for example, arithmetic and reading skills. These machines typically operate under the control of a micro-processor and present a problem to be solved to the user. The user-entered response is then evaluated as correct or incorrected and an appropriate audio or visual response is provided by the machine. For example, in the case of a machine for enhancing arithmetic skills, a problem is presented on a display device, such as a LED or LCD display, and the user is asked to enter the correct numeric answer via a keypad. The machine then evaluates the user-entered answer and provides an appropriate response to the user as to the correctness of the answer. In the case of a machine that improves spelling skills, an audio request to enter a selected 'target' word is made, usually by a program controlled voice synthesizer, with the user entering his response via an alpha-character keypad. The response is evaluated and an appropriate indication provided to the user. In general, machines that provide instruction in arithmetic and spelling skills utilize readily available and inexpensive alpha-numeric displays and keypads such that the manufacturing costs are sufficiently low to make the machines available to a large number of consumers.

Instructional and educational machine that provide instruction in writing skills, including stroke-forming, and character forming skills, however, have not been marketed generally since machines that provide instruction for improving writing skills require far more sophisticated display devices, for example, an all points addressable (APA) graphics display for the presentation of a large combination of linear and curved strokes, a user-input device capable of accepting a wide variety of linear and curved strokes, and, lastly, a capability of effecting some type of consistent evaluation of the user-entered response. For example, the apparatus disclosed in U.S. Pat. No. 4,464,118 issued Aug. 7, 1984 to Scott et al discloses a machine for improving penmanship and drawing skills which includes a speech synthesis system, a display device, drawing surface, and an optical input system by which characters drawn on a drawing surface by the user are projected into an optical imager which then provides an electrical output to a stored-program processor for character recognition processing. The use of an optical projection system, as disclosed in the '118 patent, poses a number of practical limitations since the optical components, including mirrors and lenses, make difficult the construction of a compact and inexpensive machine. Accordingly, instructional and educational machines that improve stroke-forming and character-forming skills have not been marketed generally in comparison to the widespread success of the machines that improve arithmetic add spelling skills.

SUMMARY OF THE INVENTION

It is an object of the present invention, among others, to provide an apparatus for teaching writing skills, particularly stroke forming and character forming skills.

It is another object of the present invention to provide an interactive apparatus for teaching stroke and character forming skills in which a stroke or character to be taught is first visually displayed to the user and a user-inputted stroke is compared to the displayed stroke and the results of the comparison provided to the used.

It is another object of the present invention to provide an interactive apparatus for teaching stroke and character forming skills in which a displayed stroke or character is compared against a user inputted stroke and the user inputted stroke is graded to provide an indication to the user of the quality of the user inputted stroke.

In view of these objects, and others, the present invention provides a interactive instructional apparatus and method by which the apparatus presents one or more strokes on a display device and the user enters the strokes on a digitizer which then provides a digital representation of the user-entered strokes to a stored-program controlled micro-processor which compares the user-entered strokes with the displayed stroke or strokes, grades the strokes, and provides an appropriate response to the user. A graphics display device, in the form of a LCD or functionally equivalent display, is provided to display the requested stroke or strokes with instructions provided concurrently via a program-controlled voice synthesizer. The user attempts to copy the displayed stroke on a digitizer that provides real-time X,Y analog coordinate outputs to an analog-to-digital converter which, in turn, provides a digital output to the microprocessor which grades the input stroke and provides an audio or visual response to the user that is appropriate for the grade.

A user entered stroke is graded by scanning the digital representation of the stroke for extreme points, that is, the beginning and end points of the stroke as well as local maximas and minimas, and sub-dividing the stroke into 'segments' in accordance with the detected extreme points. Thereafter, each of the segments is analyzed relative to reference values for a segment including an assessment of the end positions of the stroke, the stroke orientation, curvature in the case of a non-linear stroke, and the direction in which the stroke was drawn. In the case of a multi-stroke character, the connectivity of the various strokes is also assessed. The various assessments, which can be weighed in accordance with a predetermined arrangement, are summed on a point scale and deducted from a maximum or optimum point value to provide a representative grade. One of a plurality of audio and/or visual responses is then provided to the user in such a manner as to enhance learning.

A principal objective of the present invention is, therefore, the provision of an improved interactive instructional apparatus and method for teaching and enhancing stroke forming, character forming, and writing skills. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIGS. 4 and 4A are a flow diagram representative of a first instructional lesson for providing stroke forming skills;

FIGS. 5 and 5A are a flow diagram representative of a second instructional lesson for providing character forming skills on a stroke-by-stroke basis;

FIGS. 6 and 6A are a flow diagram representative of a third instructional lesson, similar to that of FIGS. 5 and 5A, for avoiding character forming skills;

FIGS. 11A, 11B, and 11C are graphical representations by which the upper case letter "R" is analyzed to identify the straight line and curvilinear strokes that define the letter and the segments that define the strokes;

FIG. 13 is a table illustrating the manner by which the segments of FIGS. 12A and 12B ar analyzed.

DESCRIPTION OF THE PREFERRED EMBODIMENT

Figure 1:
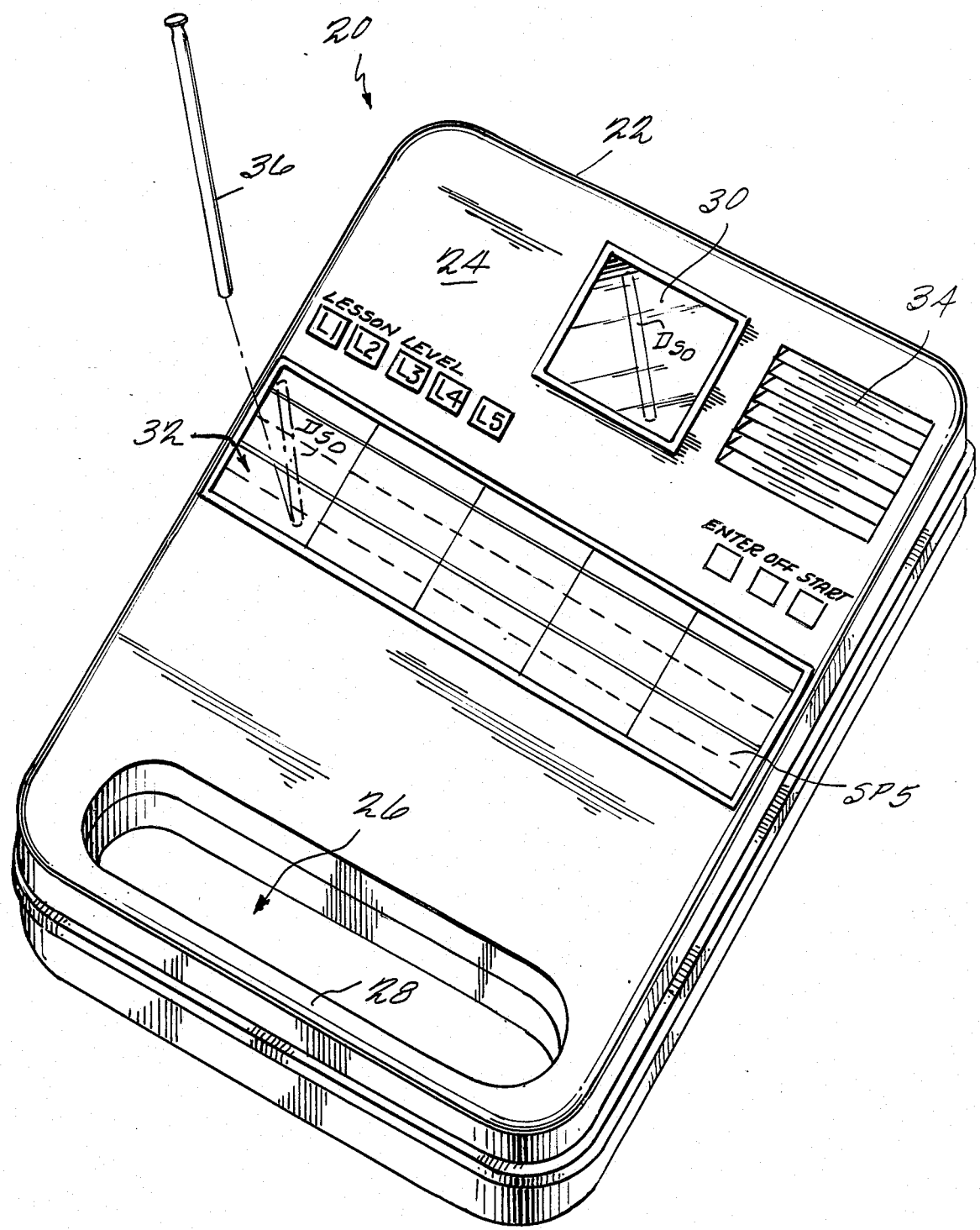
FIG. 1 is a pictorial representation of an apparatus for teaching stroke and character forming skills in accordance with the present invention.

An interactive instructional machine in accordance with the present invention is shown in FIG. 1 and designated generally therein by the reference character 20. As shown, the instructional machine 20 includes a case 22 having a front panel 24 and a thru-opening 26 at one end of the case 22 to define a carrying handle 28 which can be grasped by the user. The front panel 24 includes a liquid crystal display (LCD) 30 for displaying one or more straight or curved strokes or fully formed characters, as explained below, a digitizer 32 for accepting user entered strokes and/or characters, a plurality of pressure responsive keypads L1, L2, L3, L4, and L5 for selecting instructional "lessons," an ENTER keypad, an OFF keypad, and a START keypad. Additionally, a sound transducer, such as a loudspeaker, (not specifically shown in FIG. 1) is mounted internally within the case 22 behind an apertured or slotted area 34 and provides voice synthesized audio messages or tone signals to the user. As shown in FIG. 1, the surface of the digitizer 32 is divided by a series of dashed and solid lines to emulate the guidelines commonly found in elementary lesson books relating to writing skills. Additionally, the surface of the digitizer 32 is also divided into five spaces, from the left to the right, $SP_1, \ldots SP_5$ to allow a succession of strokes or characters to be drawn by the user.

The instructional machine 20 is operated by pressing the START keypad and selecting one of several available "lessons," for example, by pressing the L2 keypad. As explained in more detail below, the instructional machine 20 responds by 'drawing' an exemplary stroke, as indicated by the displayed stroke $DS_0$ in FIG. 1, on the display 30. The term 'drawing', as used herein, is the progressive display of the stroke $DS_0$ from the starting point to the end point, as distinguished from the substantially instantaneous display of the entire or completely formed stroke. Since the exemplary stroke is drawn over a selected period of time, the user can see the stroke form from its beginning point to its end point during the observation period and thus observe the direction in which the stroke is drawn. In a 'lesson' where multiple strokes are drawn, the user can see the sequence in which the strokes are drawn as well as the direction of each stroke. After observing the stroke DSO presented on the display 30, the user attempts to redraw the stroke shown on the display 30 on the digitizer 32 using a stylus 36 and attempts to reproduce the general position of the stroke, its length and direction, and its where a non-linear stroke is displayed. When a plurality of strokes are presented on the display 30, the user also follows the sequence of the strokes displayed and the connectivity of the strokes. The user-entered stroke, as represented by the stroke $US_0$ (dotted line illustration) on the left portion of the digitizer 32, is then reduced to a set of digital values by a stored-program processor, discussed more fully below, and compared with a ideal value to 'grade' the user-entered stroke $US_0$. An indication, in the form of an audio and/or visual response, is then provided by the instructional machine 20 to the user as an indication of performance. By varying the types and quantity of strokes and the evaluative response provided by the machine 20, the user can become adept at forming strokes and characters attendant to developing hand writing skills.

Figure 2:
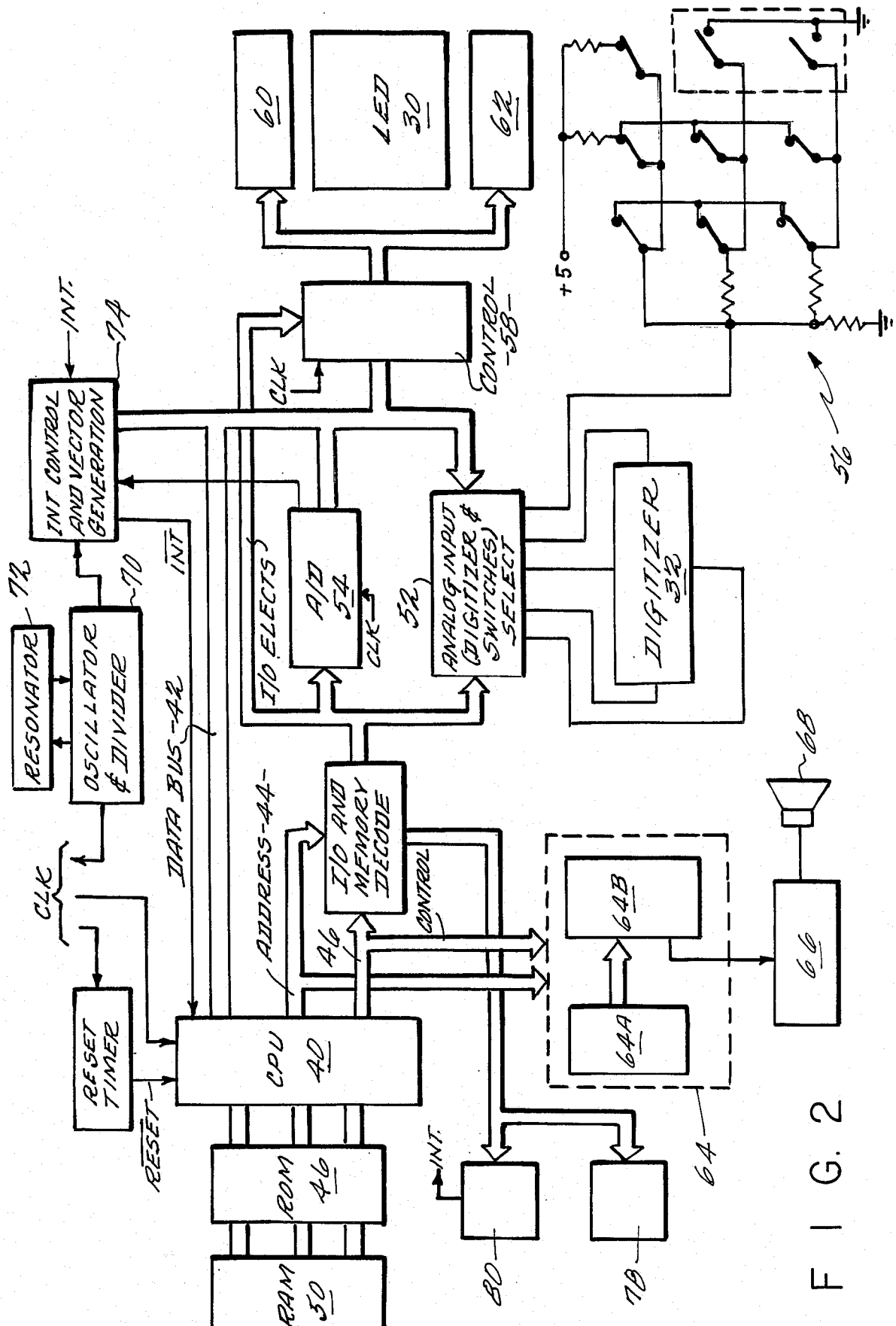
FIG. 2 is a schematic block diagram of a stored-program controlled system in accordance with the present invention.

A functional block diagram of the instructional machine 20 is shown in FIG. 2 and presents a stored-program controlled microcomputer that displays selected strokes and characters on the display 30, analyzes the user-entered stroke or strokes inputted via the digitizer 32, and provides an indication of the score or grade of the stroke to the user. A shown in FIG. 2, a microprocessor 40 is coupled through a data bus 42, an address bus 44, and a control bus 46 to various other devices including a ROM 48 containing a stored program, as summarized in FIGS. 3 to 8, and a RAM 50 for temporary storage of digital values representative of the user entered stroke $US_0$ and intermediate values relating to the analysis of the user entered stroke $US_0$. The ROM 48 contains digital data representing various strokes, such as leftward and rightward diagonal strokes, horizontal and vertical strokes, and various open and closed curvilinear segments and loops used to form the various characters of the alphabet and various numbers. In addition, various geometric figures can likewise be formed.

The digitizer 32 uses a pressure sensitive mechanism that responds to the pressure of a pen or stylus 36 drawing a stroke or figure upon its surface. The digitizer 32 provides $-X$, $+X$, $-Y$, and $+Y$ outputs to an analog select device 52 which, in response to a control input, selects one of the available analog inputs and presents the selected input to an analog-to-digital converter 54 which digitizes the analog input and provides a digital word of selected length (e.g., 10 bits) representative of the analog input voltage. The digitizer 32 is preferably of the type that includes semi-flexible overlying membranes (not shown) having their facing surfaces coated with a resistive material and maintained in a normally spaced apart relationship by non-conductive spacers dots. When one of the membranes is locally deformed by the stylus 36 to cause its resistive coating to contact the resistive coating of the facing membrane, a analog voltage level is presented between the $-X$ and $+X$ terminals and another voltage level is presented between the $-Y$ and $+Y$ terminals, the voltage levels being dependent upon the relative X,Y position of the stylus 36. A power supply voltage is periodically applied across the digitizer 32 and the $-X,+X$ and $-Y,+Y$ terminals polled in a recurring manner by the analog input select device 52 to provide the X position and Y position analog voltage to the analog-to-digital converter 54 for real-time conversion into corresponding X,Y digital data point pairs for storage in the RAM 50.

On/Off control and selection of the desired lesson is provided through a switch matrix, generally indicated at 56, that includes a plurality of single-pole, single-throw switches $S_1$, $S_2$, $S_3$, $S_4$, $S_5$, and $S_n$ for selecting the corresponding lessons and switches (unnumbered) for the OFF, START, and ENTER functions. The various switches $S_n$ are connected to the positive power source through resistors, indicated in generalized form by the reference character Rn, of differing resistance values. Closure of a selected switch $S_n$ will define a voltage divider circuit between the resistor $R_n$ associated with closed switch $S_n$ and a ground path resistor $R_g$ and provide corresponding voltage level to the analog input select device 52. The switch-provided voltage, when converted to a digital value by the analog-to-digital converter 54 functions as a command to cause the microprocessor 40 to initiate a selected stored-program control subroutine, as discussed more fully below in the context of FIGS. 3–8. The START switch 57 is a double-pole, single-throw switch that can be sensed by the microprocessor 40 as in the case of the other switches or can be used to directly apply power after power down. In this latter case, one pole is used to initiate power on and the the other pole is connected to the voltage divider circuitry.

A display controller 58 is coupled to the data and address busses 42 and 44 and provides appropriate drive signals to the display drivers 60 and 62, which, in turn, provide appropriate row and column drive signals to the display 30. In the preferred embodiment, the display 30 has a 32 by 32 resolution to provide a total of 1024 addressable pixels.

A voice unit, generally indicated at 64, receives appropriate control signals and provides a synthesized voice output to an amplifier 66 which provides the amplified signal to a loud speaker 68 located behind the apertured or slotted area 34 of the case 22. The voice unit 64 is of conventional design and includes a voice memory 64A and a speech synthesizer 64B which provides preselected audio messages to the user.

A system oscillator 70, which may include a step-down divider, is driven by a ceramic or crystal resonator 72 and provides clock pulses CLK to the various devices. An interrupt controller 74 accepts interrupts from various sources and provides an interrupt signal to the microprocessor 40. An input/output and memory decode controller 76 controls addressing of the voice unit 64 as well as managing control signals to and from a memory expansion port 78 and a serial I/O port 80 for connection to auxiliary devices or accessories (not shown).

Figure 3:
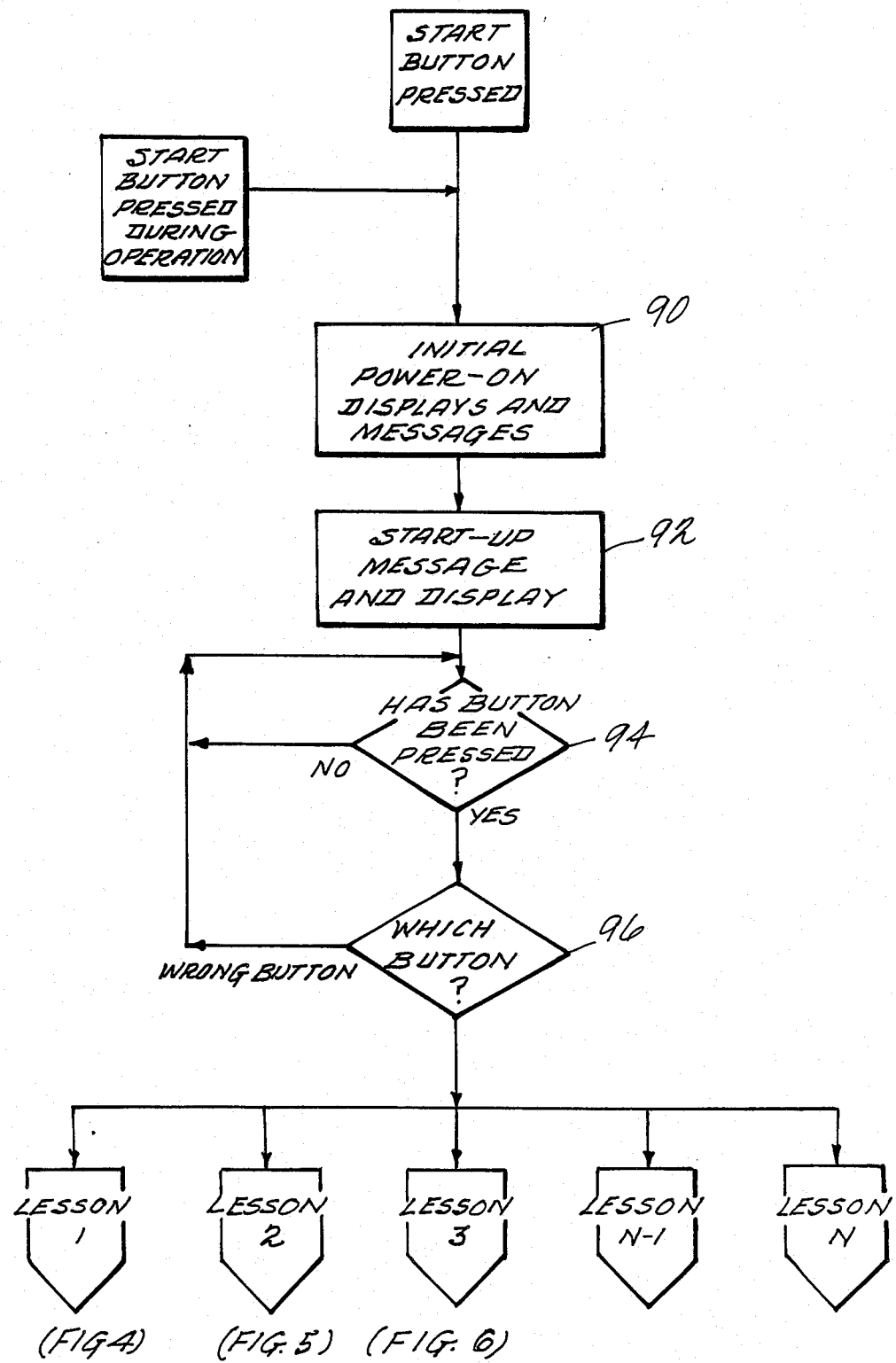
FIG. 3 a flow diagram representative of the initialization response of the machine presented in FIGS. 1 and 2.
Figure 6:
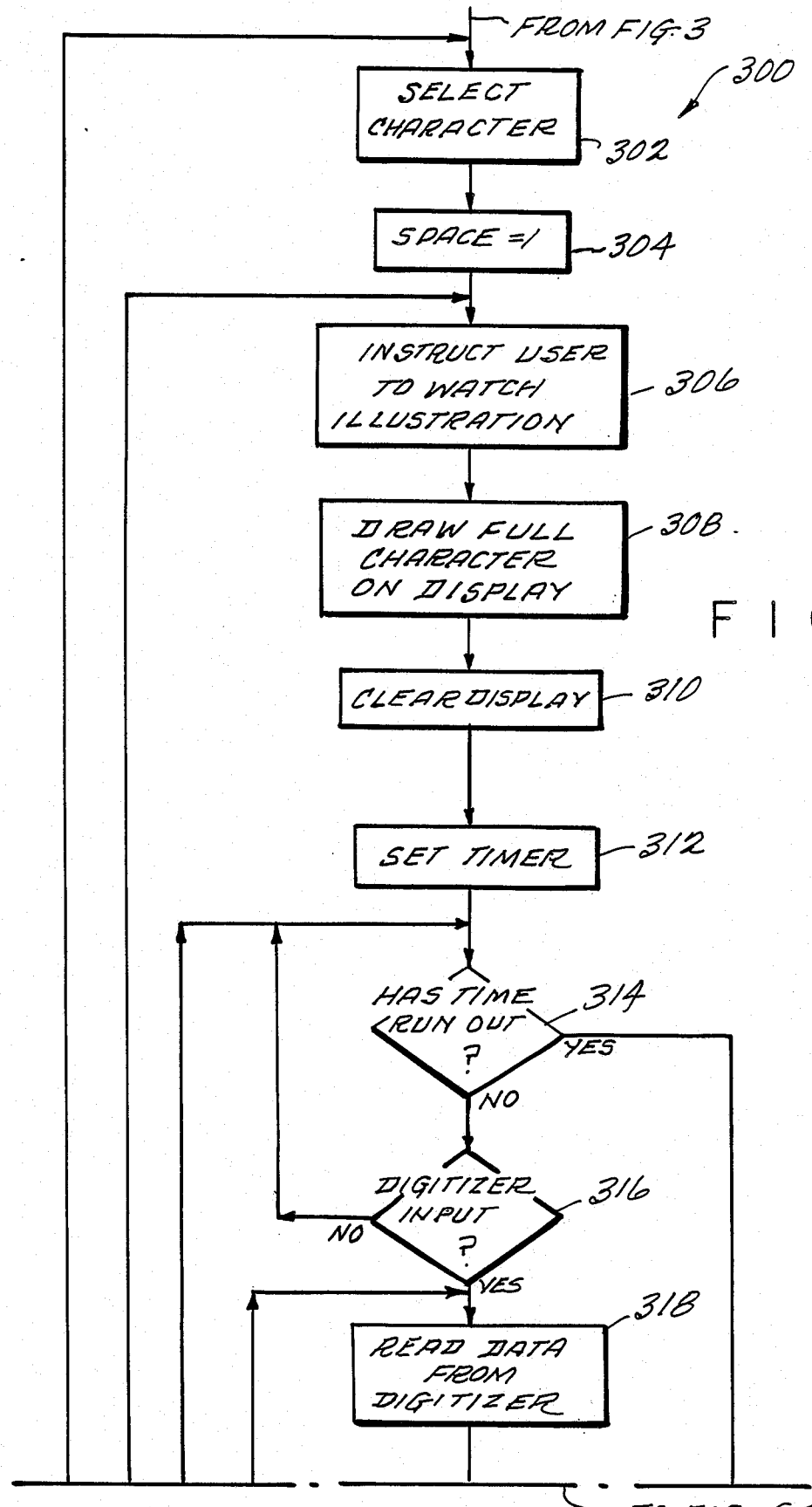
Figure 7:
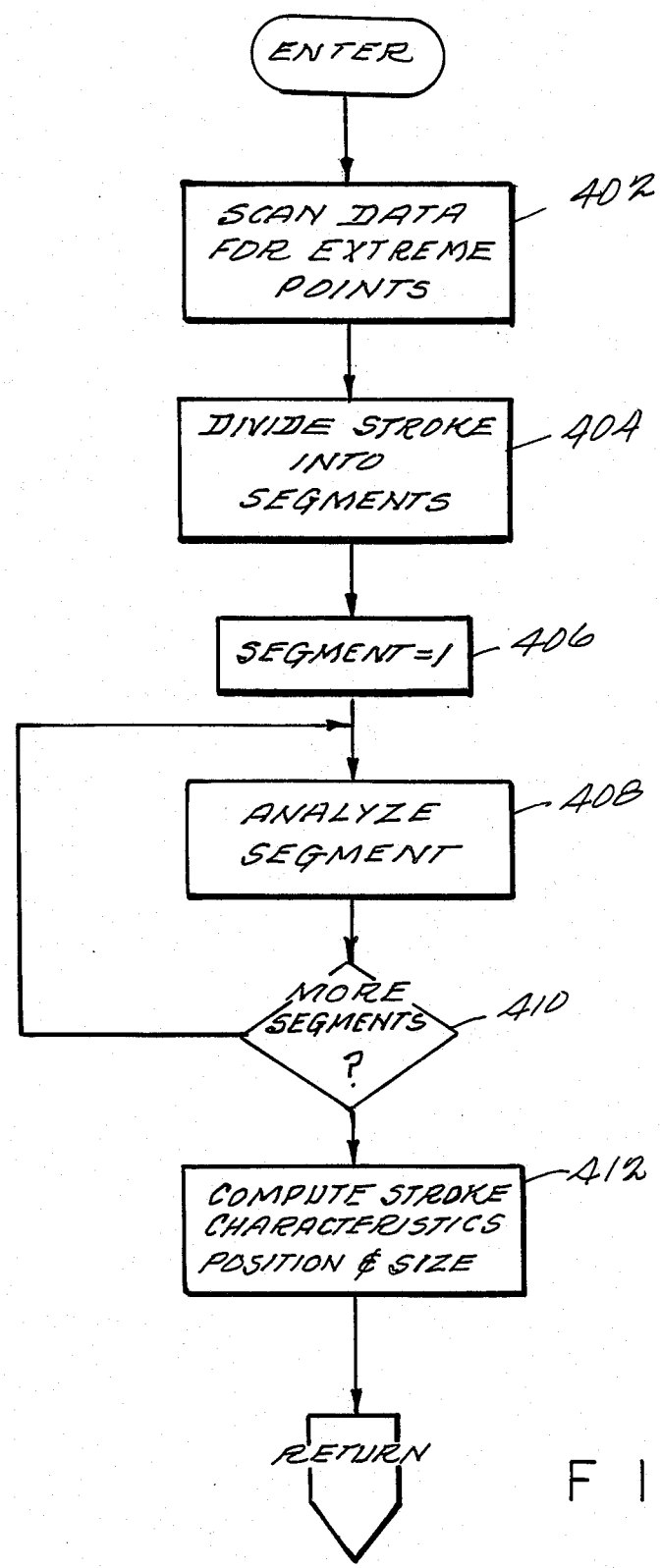
FIG. 7 is a flow diagram for analyzing a user inputted stroke and identifying segments that comprise the input stroke.
Figure 8:
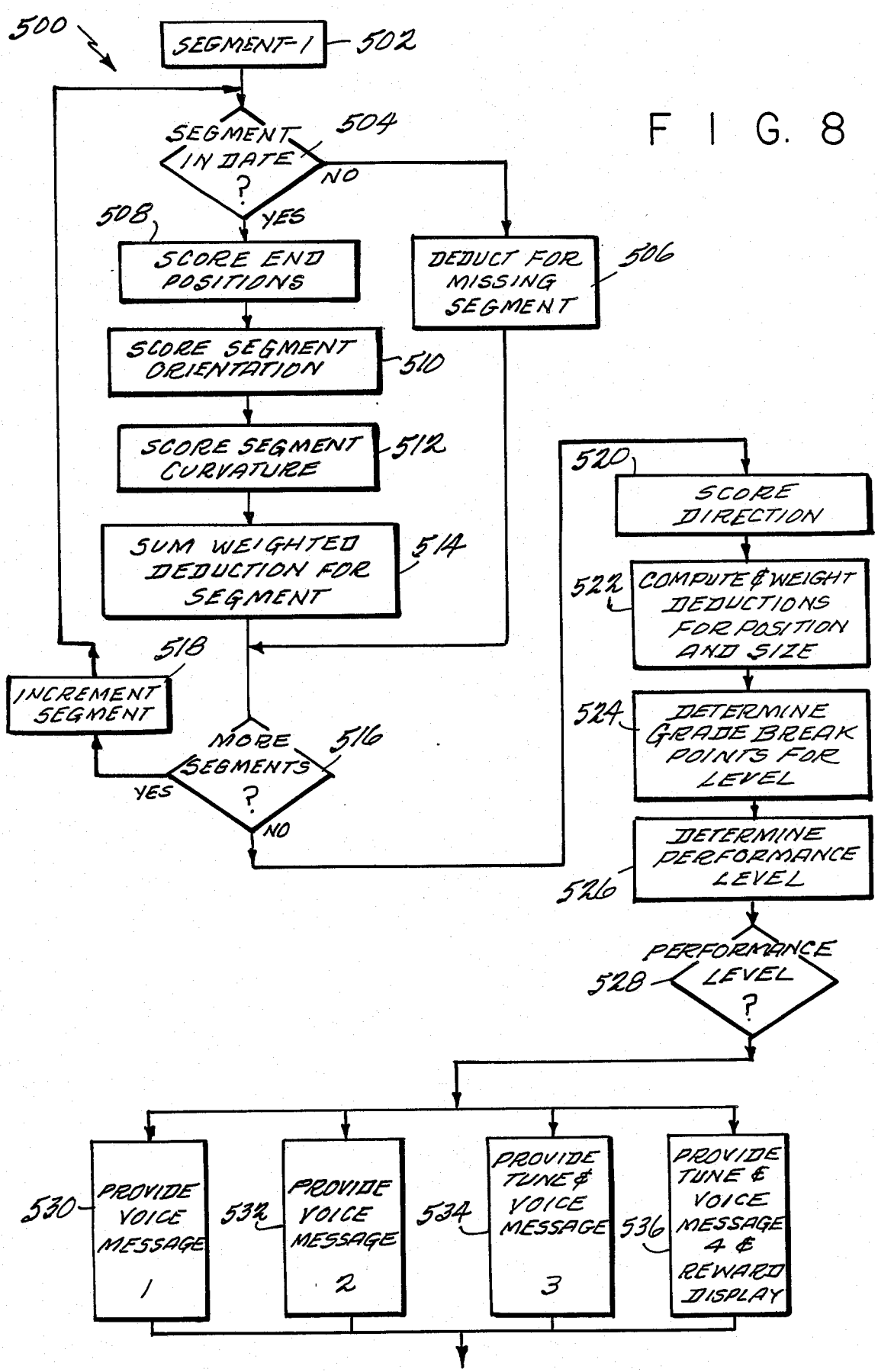
FIG. 8 is a flow diagram for analyzing segments identified in the flow diagram of FIG. 7.

The user initializes the machine 20 by depressing the START keypad and, as shown in FIG. 3, the initialization sequence includes commands 90 and 92 which provide power-on and start-up messages after which the program control loops about a query 94 which determines whether or not one of the 'lesson' keypads L1, L2, L3, L4, or L5 has been depressed. If one of the 'lesson' keypads has been depressed, a query 96 is presented to determine which lesson has been selected by the user with the program control branching to the appropriate subroutine, including a lesson 1 routine (FIGS. 4 and 4A), a lesson 2 routine (FIGS. 5 and 5A), or a lesson 3 routine (FIGS. 6 and 6A). Lesson 1 presents a single stroke $DS_0$ to be emulated by the user, Lesson 2 presents a succession of strokes that build a character on a stroke-by-stroke basis, and Lesson 3 presents a fully formed character for emulation. While three lessons are described below and are exemplary of the preferred embodiment, other lessons $L_{n-1}, \ldots, L_n$ can likewise be provided. Additionally, and as explained below, the program can call one or more subroutines that function to analyze and score an input stroke, as shown in FIGS. 7 and 8 and as explained below.

Figure 4:
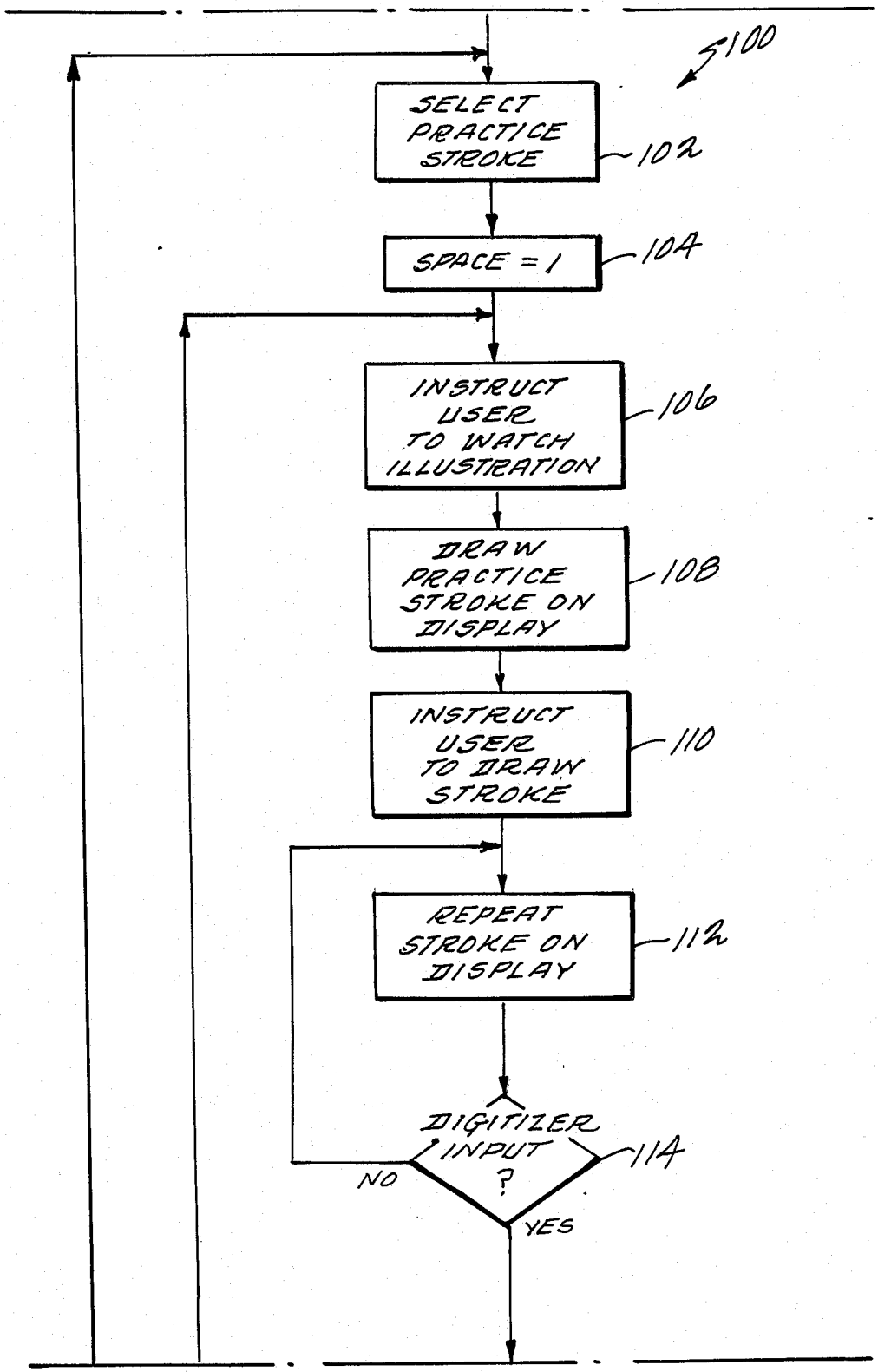

In the event the user selects lesson 1, program control branches from the initialization routine of FIG. 3 to the subroutine represented by the flow diagram 100 of FIGS. 4 and 4A. As shown, a command 102 is executed to select a practice stroke, for example, a straight leftwardly inclined and downwardly drawn stroke, with the next command 104 setting the 'space counter' variable to one to thus specify the first space SP1 of the digitizer 32 as the input space, the first space SP1 being at the leftmost portion of the digitizer 32 in FIG. 1. Thereafter command 106 controls the voice unit 64 to issue an audio instruction to the user, for example, to watch the display 30. The practice stroke $DS_0$ is then drawn on the display 30 by command 108. In drawing the practice stroke DSO, the microprocessor 40 issues signals via the various busses and signal lines to the controller 58 which then, through the row and column drivers 60 and 62, sequentially turns on a succession of pixels of the display at a rate sufficiently slow to allow the user to see the practice stroke $DS_0$ being drawn, a time frame of 0.5 to 1.0 seconds generally being sufficient. The exemplary displayed stroke $DS_0$ begins at the upper left of the display 30 and proceeds downwardly and to the right to an end point at the lower right of the display. After completion of the practice stroke $DS_0$, at command 110, the microprocessor 40 directs the voice unit 64 to instruct the user to enter a stroke $US_0$. During the time prior to the user actually entering the user stroke in the space SP1 of the digitizer 32, the displayed stroke $DS_0$ is redrawn by command 112 with query point 114 discontinuing the redrawing when an input from the digitizer 32 is detected. The display 30 is then erased by command 116 with the X,Y output of the digitizer 32 being read, stored in the RAM 50 in digital format (after conversion in the analog-to-digital converter 52), and presented on the display 30 by commands 118 and 120. A query 122 continues the reading and redisplay of the user stroke $US_0$ until output from the digitizer 32 ceases. The real-time or near real-time display of the user-entered stroke $US_0$ provides the user with a measure of feedback as to the quality of his stroke and permits mid-stroke correction. After the entry of the user stroke $US_0$ has been completed, as determined by query 122, the user stroke $US_0$ is graded by functions 124 and 126 called into the subroutine and as described more fully below. The graded response can be provided, for example, by selecting one of several audio responses having varying degrees of criticism or praise as a function of the 'grade' of the user entered stroke. After the graded response is provided by the function 126, a query 128 determines if the 'space counter' variable is equal to five, and, if not, the 'space counter' variable is incremented by one by command 130 with control looping to command 106 (FIG. 5) where the sequence is repeated on a recurring basis until the 'space counter' variable eventually equals five. When the 'space counter' variable equals five, command 132 determines the best if the user entered strokes $US_n$, for example, by selecting the user entered stroke $US_n$ with the highest numeric grade, and provides an appropriate audio indication to the user. Lastly, command 130 instructs the user to erase the display 30.

Where Lesson 2 is selected, as shown in FIGS. 5 and 5A, the flow diagram 200 is executed to present a succession of strokes which define a character. In Lesson 2, the user emulates each of the successively presented strokes on a stroke-by-stroke basis to then emulate the character presented on the display 30. Where the user selects 'Lesson 2', the program control branches from the initialization sequence of FIG. 3 to the subroutine represented by the flow diagram of FIG. 5. As shown, a command 202 is executed to select a practice character, for example, the upper case letter "A", with the next command 204 setting the space select variable to one to thus specify the first space SPI of the digitizer 32 as the input space. Thereafter, command 206 controls the voice unit 64 to issue an audio instruction to the user to watch the display 30. The selected practice character is then drawn in its entirety on the display 30 by command 208, after which the display 30 is cleared by command 210. In the case of an upper case letter "A", the character is displayed by first displaying a rightwardly inclined stroke, a leftwardly inclined stroke connected at its upper end to the preceding stroke, and, lastly, a horizontal, mid-position stroke. A 'stroke counter' variable is set equal to one by command 212 and any strokes previously entered by the user are restored to the display 30 by command 214. Where the user is entering the first stroke of a selected practice character, no previous strokes will be restored to the display 30. Thereafter, the first stroke of the selected practice character is drawn on the display 30 by command 216 and an audio instruction is then presented by the command 218 to control the voice unit 64 to instruct the user to draw the first stroke in the first space. The program control then enters a recurring loop by which the drawn stroke is cleared by command 220 and redrawn by command 222 with query 224 branching to reclear and redraw the stroke until an input is detected from the digitizer 32. When a user input is detected by query 24, the display 30 is cleared and any previous stroke inputs are restored by command 226. The data from the digitizer 32 is read by command 228 and stored and presented on the display 30 by command 230 with this read, store, and display sequence recurring until query 232 determines that user input has ceased. After the user has ceased entering the stroke and as described more fully below, a function 234 is called to grade the input stroke, another function 236 is called to grade the stroke connectivity relative to other displayed strokes, and a function 238 is called to provide a graded response to the user. If there are additional strokes in the selected character, as determined by query 240, the 'stroke counter' variable is incremented by one by command 242 with program control looping to command 214 (FIG. 5) with previous strokes restored to the display 30 and with the sequence continuing until all the strokes that define the selected character have been presented on the display 30 and entered by the user. Once the selected practice character has been completed, a 'Grade Input Character' function 244 is called to grade the input character with a 'Provide Graded Function' 246 subsequently called to provide a graded response to the user. A query 44B is presented to determine if the 'space counter' variable is equal to five, and, if not, the 'space counter' variable is incremented by one at command 250 with the program looping to command 206 (FIG. 5) where the user is instructed to watch the display 30 to thus repeat the sequence. When all spaces have been used, command 252 determines which of the user inputted characters had the best grade, for example, by arithmetic comparison, and provides an appropriate response to the user and with command 254 instructing the user to erase the display 30.

Where Lesson 3 is selected, as shown in FIGS. 6 and 6A, the flow diagram 300 is executed to present a fully formed character, as distinguished from lesson 2, where the strokes that define a character are presented on a stoke-by-stroke basis. Where the user selects 'Lesson 3' by pressing the appropriate keypad, the program control branches from the initialization sequence of FIG. 3 to the subroutine represented by the flow diagram 300 of FIG. 6. As shown, a command 302 is executed to select a practice character, such as the upper case letter "V", and the next command 304 sets the 'space counter' variable to 1 to thus specify the first space SPI of the digitizer 32 as the input space. Thereafter command 306 controls the voice unit 64 to issue an audio instruction to the user to watch the display 30. The selected practice character is then drawn on the display 30 by command 308, after which the display 30 is cleared by command 310. A timer is set by command 312 with sufficient time to allow a user to enter the selected practice character. A query 314 is presented to determine if the timer has timed out with program control branching to a subsequent portion of the program to grade whatever character or portion of a character is entered by the user, as explained below. When the timer has not timed out, a query 316 determines if an input is present from the digitizer 32, and, if not, program control successively loops about the time-out query 314. Where a digitizer 32 input has been detected by the query 316, the input data is read from the digitizer 32 by the command 318 and stored and presented on the display by command 320 (FIG. 6A). A query 322 continues the read, store, and display loop as long as an input from the digitizer 32 is detected and, if the input from the digitizer 32 ceases, a query 324 is presented to determine if all the strokes for the formation of the practice character have been inputted, and, if so, loops to a point just prior to the time-out query 314 (FIG. 6). The program then progresses to functions 326 and 328 to respectively grade an input character add provide the graded response. A query 330 is presented to determine if the 'space counter' variable is equal to five and, if not, the 'space counter' variable is incremented by one at command 332 with the program looping to command 306 where the user is instructed to watch the display 30. When all spaces have been used, command 334 determines which of the user inputted characters had the best grade, for example, by arithmetic comparison, and provides an appropriate response to the user and with command 334 instructing the user to erase the display 30. The program control then loops to the command 302 (FIG. 6) where another character is selected and the sequence resumed.

In the subroutines of FIGS. 3-6A, various functions are called to grade an input stroke or character and to provide a graded response. As part of the grading function an input stroke is analyzed, as explained below, to identify segments that comprise the stroke, and, where multiple strokes are involved, the connectivity between strokes. A combined function for analyzing the input stroke by identifying segments that define the stroke and grading the segments is shown in FIGS. 7 and 8 and designated therein by the reference character 400. As shown, the data stored in the RAM 50 representing the stroke to be analyzed is scanned by a scanning function 402 for the extreme points. Since the data representative of a stroke is defined in terms of successively entered X,Y data pairs, the end points are represented by the first an last of the successively entered data pairs and the extreme points intermediate the end points of the input stroke are determined by successively examining each data pair until local maxima and minima values are located, as described more fully below with regard to FIGS. 9 and 10. Thereafter, the input stroke is subdivided into segments by function 404, each segment extending between adjacent end points as identified by function 402. In the case of a single linear stroke inputted by the user, for example, a diagonal slash mark, the input stroke would be defined as a single segment coextensive with the input stroke. In the case of a curved stroke, as explained below in relationship to FIGS. 11A-11C, the input stroke can be divided into two segments. A 'segment counter' variable is then set to one by command 406 and the first segment analyzed by function 408, described more fully below. Thereafter, the remaining segments, where a stroke is composed of plural segments, are successively analyzed with analysis continuing until query 410 determines that all segments constituting the input stroke under analysis have been evaluated. The stroke characteristics, including position and size, are then determine by command 412.

The stroke segments identified between program steps 402 and 412 of FIG. 7 are scored by the program steps represented in the flow diagram 500 of FIG. 8. As shown, a 'segment counter' variable is initialized to one by command 502 for scoring the first segment that defines the input stroke. A query 504 is presented to determine if the data for the first segment is available, and, if not, the program branches via command 506, which deducts points for a missing segment, to a subsequent query described below. If the segment data is available, the end positions of the segment are scored by function 508, te segment orientation is scored by function 510, and the segment curvature is scored by function 512. The scores determined by the functions 508, 510, and 512 and then provide a weighted deduction from the ideal value for the segment with the final score determined by command 514. When additional segments are to be evaluated, a query 516 b to increment the 'segment counter' variable by one 518 and program control looping to the query 504 to continue evaluation on a segment by segment basis. After all the segments are evaluated, the direction of the stroke is evaluated by function 520 with the following command 522 computing the weighted deduction from the ideal value as a function of the position and size of the input stroke. The grade break points for the difficulty level are determined by function 524 and the performance level is determined b function 526. After the performance level is ascertained, query 528 routes program control to an appropriate response 530–536 based on the performance grade. For example, voice messages can be provided (commands 530 and 532) for performance levels '1' and '2'; a voice message and tune can be provided (command 534) for performance level '3'; and a voice message, tune, and visual display can be provided (command 536) for performance level '4'. While three preferred subroutines have been illustrated for lessons 1, 2, and 3, as can be appreciated, other subroutines can be provided.

The subroutines described above call various functions in order to evaluate a user inputted stroke or strokes and provide a quantitative point value that is deducted from an ideal or optimum value to provide a graded input, these functions including extreme point determination, segment determination, and segment evaluation.

Figure 9:
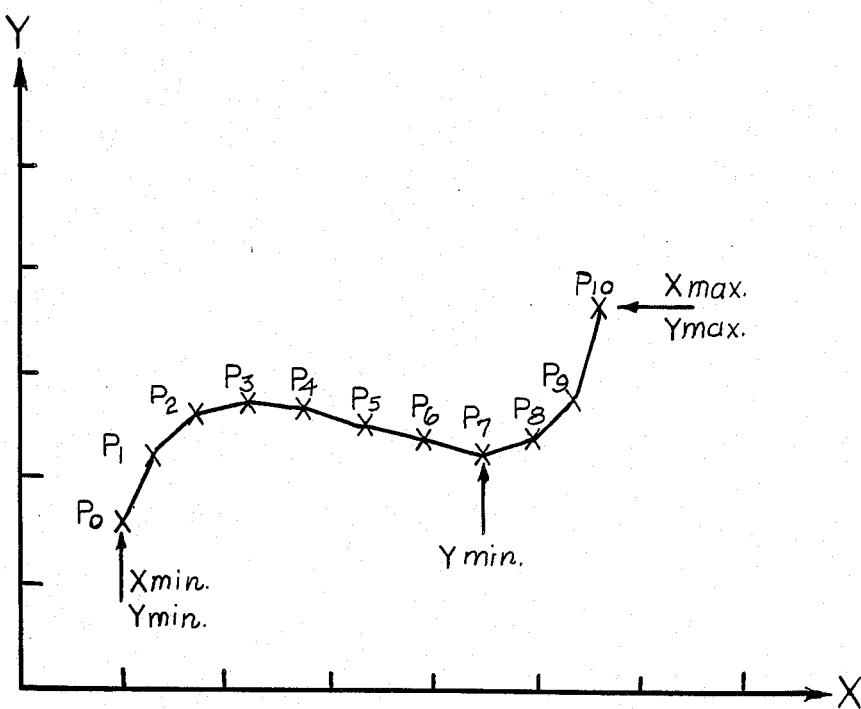
FIG. 9 is a graphical representation of an input stroke and the manner by which the extreme points for the stroke are determined.
Figure 10:
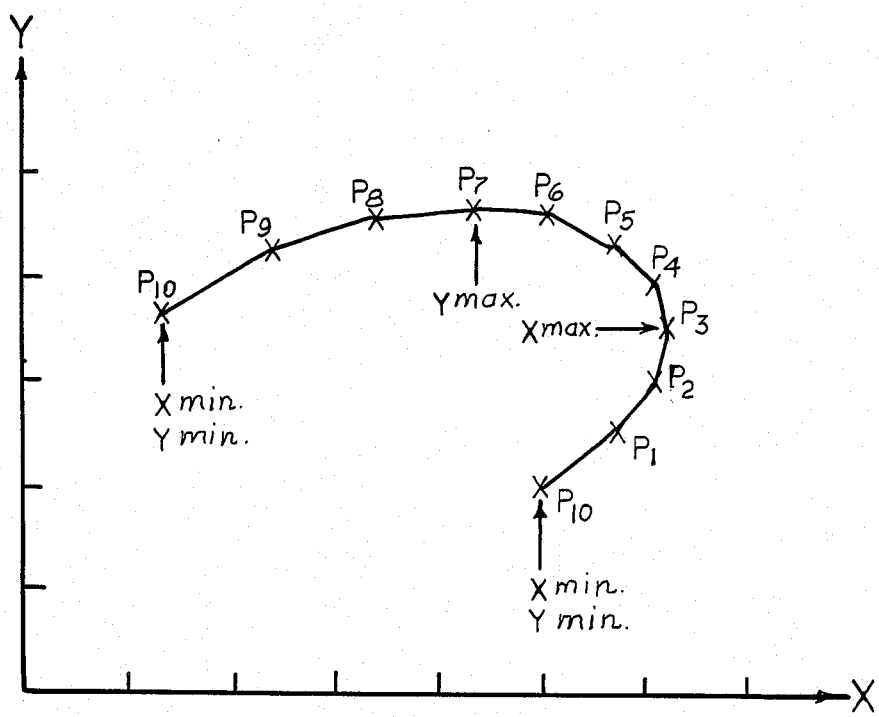
FIG. 10 is another graphical representation of an input stroke and the manner by which the extreme points for the stroke are determined.

In order to evaluate an input stroke or strokes, each stroke must be divided into segments, that is, one or more linear segments that define a stroke. Segments are identified by determining the extreme points of the stroke. The extreme points for any input stroke include the beginning and end points and any local maximas or minimas occurring on the stroke between the beginning and end points. The beginning and end points are readily determined by the first and last X,Y data points sets stored is the RAM memory 50. For example and as shown in FIG. 9, the beginning and end points for the sinuous stroke presented are readily identified as the first and last entered X,Y data pairs, viz., points $P_0$ and $P_{10}$. The extreme points intermediate the end points $P_0$ and $P_{10}$ are identified as a point where the curve of the input stroke achieves a local minimum or maximum in the X or Y direction and can be identified by comparison with adjacent points. In the context of FIG. 9, points $P_3$ and $P_7$ represent extreme points and are determined by detection of local maximas in the X direction where $P_1, P_2, \ldots, P_n$ are a series of X,Y data points describing a continuous stroke, point $P_i$ having coordinates $X_i, Y_i$ will be a local maxima in the X direction if, for some range of points $P_j$ through $P_k$ with $j < i < k$ and $X_1 \geq X_1$ for all l where $j \leq l \leq k$. Conversely and with regard to the detection of local minimas in the X direction, where $P_1, P_2, \ldots, P_n$ are a series of X,Y data points describing a continuous stroke, a point $P_i$ having coordinates $X_i, Y_i$ will be a local minima in the X direction if, for some range of points $P_j$ through $P_k$ with $j < i < k$ and $X_i \leq X_1$ for all l where $j \leq l \leq k$. In an analogous manner, maximas in the Y direction are determined where $P_1, P_2, \ldots, P_n$ are a series of X,Y data points describing a continuous stroke, a point Pi having coordinates $X_i, Y_i$ will be a local maxima in the Y direction if, for some range of points $P_j$ through $P_k$ with $j < i < k$ and $Y_1 \geq Y_1$, for all l where $j \leq l \leq k$. Conversely and with regard to the detection of local minimas in the Y direction, where $P_1, P_2, \ldots, P_n$ are a series of X,Y data points describing a continuous stroke, a point $P_i$ having coordinates $X_i, Y_i$ will be a local minima in the Y direction if, for some range of points $P_j$ through $P_k$ with $j < i < k$ and $Y_i \geq Y_1$ for all l where $j \leq l \leq k$. For example and as shown in FIG. 10, the end points $P_0$ and $P_{10}$ are identified as the first and last of the successively entered X,Y data pairs with the extreme point in the X direction, $P_3$, and the extreme point in the Y direction, $P_7$, identified in the manner described.

Once the extreme points are determined for any input, the segments that define the stroke or strokes can then be determined. By way of example and as shown in FIG. 11A, the upper case letter "R" is defined by three input strokes with the vertical stroke identified as $R_1$, the curved stroke as $R_2$, and the inclined stroke as $R_3$, with these strokes shown in a disconnected relationship in FIG. 11B. Since the individual strokes $R_1$, $R_2$, and $R_3$ are entered on a stroke by stroke basis, the end points for the strokes $R_1$, $R_2$, and $R_3$ are readily determined. Once the extreme points for any stroke are determined, the segments that comprise the stroke can be determined. For example, the linear strokes $R_1$ and $R_3$ are single segment strokes with segments defined between the beginning and end points, and the stroke $R_2$ is a two segment stroke as illustrated in FIG. 11C with a first segment extending between the beginning point $P_0$ and the X direction maxima $X_m$ and the second segment extending between the X direction maxima $X_m$ and the end point $P_1$.

Once the segments are defined, the segments can be characterized by selected parameters including the relative position of the segment in the space in which it was drawn, the size of the segment, the angular orientation of the segment, the curvature of the segment, and the direction in which the segment was drawn. The relative position of the end points are determined by determining the X,Y distance from the edges of the area in which the stroke was drawn. The various spaces SP1 to SP5 into which the surface of the digitizer 32 is divided are each definable in terms of X,Y coordinates and, accordingly, the position of any stroke or segment can be ascertained by determining the difference between its X,Y data pairs and the X,Y coordinates that define the space in which the stroke was drawn. In a similar manner, the size of the stroke or segment is determined by its path length as determined by summing the incremental distances between the data points that define the stroke or segment. Lastly, the direction of the stroke is determined from the order in which the data pairs were read into the memory. Likewise, the angular orientation of the segment is based on the angle that a straight line joining the end points makes with the positive X direction, that is, the slope of the connecting line. The curvature of the segment is determined by the extent that the stroke lies to the right of the imaginary line joining the end points; a positive curvature for segments that extend to and a negative curvature for segments that intend to the left of the imaginary line. Lastly, the direction of the stroke is determined from the order in which the data pairs were read into the memory.

Once a segment or stroke has been characterized in the manner described, it can be analyzed and scored relative to a set of data points representing the ideal stroke presented to the user on the display 30 with any discrepancies subtracted from the ideal value to provide a grade.

The standard or ideal stroke description for the desired stroke is used by a function to determine how well the stroke has been drawn. For each segment, the position of the end points of the segment are compared to those of standard stroke and deductions are made based on the distance of the points from the desired positions. Next the orientation and size of the segment is compared to that of the ideal. The absolute angular distance of the segment from the ideal is used to determine the deduction for orientation, and discrepancies between the ideal orientation and the actual orientation of the user inputted stroke represent points deducted from the ideal grade or value associated with that stroke. The curvature is compared to that of the ideal segment and a deduction is computed for the difference between the data and the ideal. The direction in which the stroke was drawn is compared to the correct direction and a deduction from the ideal value is made if the stroke was not drawn in the proper direction. The position of the stroke in the space in the digitizer is compared to the ideal position and deductions for deviation in the x and y directions. The size of the character is also compared to the ideal and a deduction is made for a deviation.

Figure 12A:
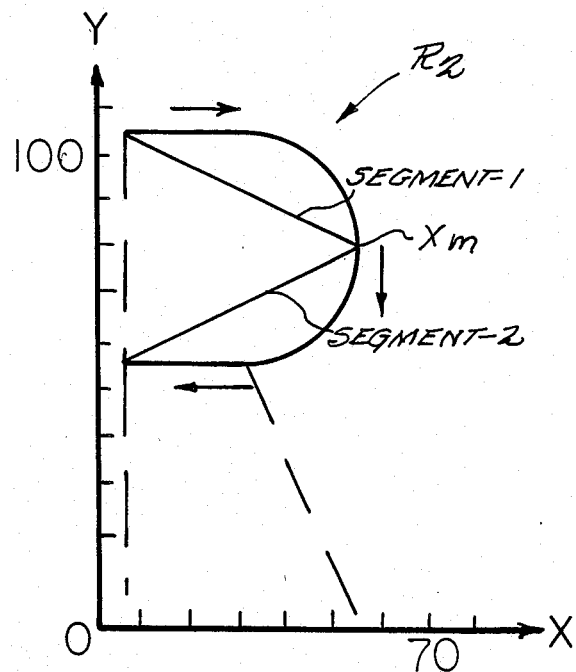
FIGS. 12A and 12B illustrate the manner by which a set of segments for a curvilinear stroke are analyzed.
Figure 12B:
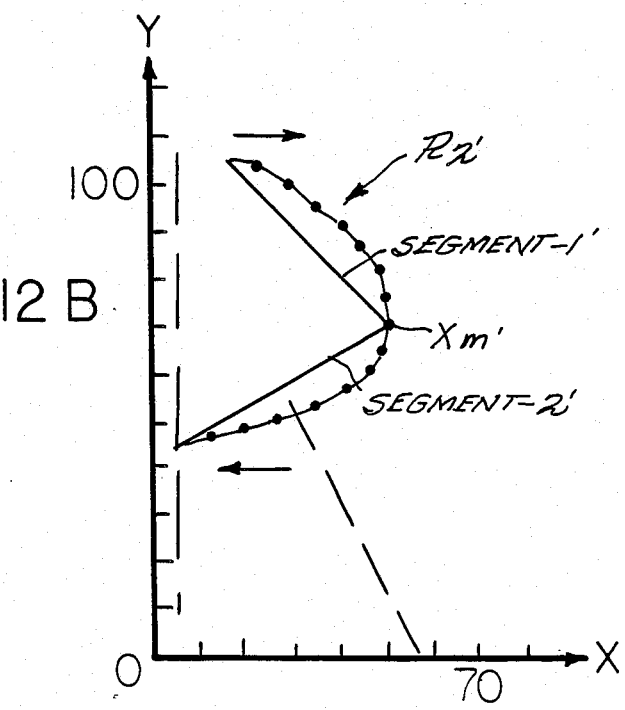

By way of example, FIG. 12A illustrates the ideal second stroke $R_2$ of the upper case letter "R" illustrated in FIGS. 11A to 11C with the stroke $R_2$ shown divided into segment 1 extending between the starting point and the X direction maxima $X_m$ and segment 2 extending between the X direction maxima $X_m$ and the end point of the stroke. The relative position of the strokes $R_1$ and $R_2$ are shown in dashed line illustration. FIG. 13 presents a table of ideal characteristics for the ideal stroke $R_2$ shown in FIG. 12A including parameters for segment 1, segment 2, and the overall stroke characteristics. For example the segment 1 parameters include position-of-start coordinates of (5,105); position-of-end coordinates of (55,80); an orientation of $-30°$; and a curvature of 6°. FIG. 12B represents an exemplary user inputted stroke $R_2'$ and, as shown, the stroke $R_2'$ deviates from the ideal stroke $R_2$ shown in FIG. 12A and, additionally was drawn in the opposite direction from the ideal stroke, as indicated by the direction of the arrows adjacent the ideal and input stroke. The input stroke $R_2'$ is analyzed to determine its extreme points, that is, the beginning and end points and any maxima. The input stroke $R_2'$ will be divided into a segment $1'$ extending between the beginning point and the position of the X direction maxima $X_m'$ and a segment $2'$ extending between the X direction maxima $X_m'$ and the end point. Thereafter, a comparison is effected between the segments $1'$ and $2'$ of the input stroke $R_2'$ and the ideal values presented in FIG. 13. For segment $1'$, the input position-of-start coordinates (12,105) deviate from the ideal position-of-start coordinates (5,105) by 7; the input position-of-end coordinates (50,70) deviate from the ideal position-of-end coordinates (55,80) by 11.2; the input orientation ($-45°$) deviates from the ideal orientation ($-30°$) by $-15°$; and the input curvature ($-30$) deviates from the ideal curvature ($-60$) by $-30$. For each deviation from the ideal, a 'deduction' value is assigned; 2 for the position-of-start deviation, 3 for the position-of-end deviation; 2 for the orientation deviation; and 1 for the curvature deviation. For segment $2'$, the input position-of-start coordinates (50,70) deviate from the ideal position-of-start coordinates (55,80) by 11.2; the input position-of-end coordinates (5,45) deviate from the ideal position-of-end coordinates (5,55) by 10; the input orientation ($-160°$) deviates from the ideal orientation ($-150°$) by $-10°$; and the input curvature ($-40$) devaates from the ideal curvature ($-60$) by 20. For each deviation from the ideal, as in the case of segment $1'$, a 'deduction value is assigned; 3 for the position-of-start deviation, 3 for the position-of-end deviation; 1 for the orientation deviation; and 1 for the curvature deviation. With regard to the overall stroke characteristics, the direction drawn of the input stroke (−) is opposite of that of the ideal stroke (+) yielding a deduction of 10; the position-in-space coordinates of the input stroke (120,30) deviate from the ideal value (145,50) by 25 yielding a deduction of 2, and, lastly, the size of the input stroke (45×25) deviates from the ideal (50×25) by 5×0 yielding a deduction of 1. The deduction for the various deviations sum 29 and is subtracted from an arbitaary ideal value to assess the overall quality the user stroke and provide an appropriate response to the user.

For characters involving multiple strokes, the points where the strokes should join or cross are examined to determine if they have the proper relationship. This property, connectivity, is evaluated based on the distance between strokes. If the ends of two strokes should meet, the distance between the ed points of the two strokes is used to measure connectivity. A deduction is made for distances greater than a minimum tolerance level. If two strokes should cross or touch at a position different from the ideal position, the difference between the actual connect point and the ideal is used to determine a deduction. For example, if the end of one stroke, such as the left end of the segment 2 of the character "R" (FIG. 12A) should meet the center of the vertical stroke $R_1$, the center of the vertical stroke $R_1$ is first calculated. The distance from this ideal point to the end point of the other stroke $R_2$ represents the degree of connectivity. In the example case of FIG. 12, three connectivity measures are made, the connectivity between the beginning of the first stroke $R_1$ and the start point of segment 1, the end point of segment 2 and the mid-point of the first stroke $R_1$.

In the illustrated embodiment, the drawn stroke or strokes and their segments are compared to the corresponding stroke and segments of the displayed or exemplary stroke or strokes to provide a quantitative deviation that is subtracted from a ideal value to provide a performance grade. If desired, the drawn stroke or strokes and their segments can be compared to the entire range of available data representing all the characters stored in the machine memory so that the machine can function in a character recognition mode with the 'recognized' character being that one which has the highest quantitative score (that is, the least deviation) relative to all the other compared characters.

Thus it will be appreciated from the above that as a result of the present invention, a highly effective interactive instructional apparatus and method is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is

1. An apparatus for providing instruction in stroke forming skills, comprising:
　display means for displaying an exemplary stroke to a user;
　input means having a stroke-drawing surface for providing a digital data output representative of a stroke drawn by a user upon said stroke-drawing surface in response to said displayed exemplary stroke;
　mode selecting means for selecting one of a plurality of instruction modes including at least one instruction mode in which a succession of exemplary strokes defining a character are presented on a stroke-by-stroke basis to said user on said display means for emulation by said user on said stroke-drawing surface;
　memory means for storing digital representations of at least one exemplary stroke for display on said display means and for storing digital data provided by said input means representative of each stroke drawn on said stroke-drawing surface in response to each displayed exemplary stroke; and
　stored-program controlled processor means for controlling said memory means and said display means in accordance with a mode selected by said mode selecting means to display each said exemplary stroke and for comparing digital data representative of each displayed exemplary stroke and each corresponding stroke drawn on said stroke-drawing surface and quantifying the deviation between the digital data representative of each exemplary stroke and the corresponding drawn stroke and for providing an indication to the user of the deviation.

2. The apparatus for providing instruction in stroke-forming skills of claim 2, further comprising:
　sound generator means for providing an indication to the user of the deviation.

3. The apparatus for providing instruction in stroke-forming skills of claim 1, wherein digital data representative of each exemplary stroke and each stroke drawn on said stroke-drawing surface are stored as a series of X,Y coordinate points.

4. The apparatus for providing instruction in stroke-forming skills of claim 1, wherein said stored-program controlled processor means displays each exemplary stroke by successively controlling discrete picture elements of said display means from a start point to an end point at a rate sufficiently slow to allow perception of the direction of each exemplary stroke.

5. The apparatus for providing instruction in stroke-forming skills of claim 3, wherein said stored-program controlled processor means compares at least the position of start coordinate points for each stroke drawn on the stroke-drawing surface of said input means an the position of start coordinate points for each exemplary stroke presented on said display means.

6. The apparatus for providing instruction in stroke-forming skills of claim 5, wherein said stored-program controlled processor means compares at least the position of end coordinate points for each stroke drawn on the stroke-drawing surface of said input means and the position of end coordinate points for each exemplary stroke presented on said display means.

7. The apparatus for providing instruction in stroke-forming skills of claim 6, wherein said stored-program controlled processor means compares at least the orientation with respect to a fixed coordinate axis of each stroke drawn on the stroke-drawing surface of said fixed coordinate axis of each exemplary stroke presented on said display means.

8. The apparatus for providing instruction in stroke-forming skills of claim 7, wherein said stored-program controlled processor means compares at least the curvature for a stroke drawn on the stroke-drawing surface of said input means and the curvature for an exemplary stroke presented on said 9. The apparatus for providing instruction in stroke-forming skills of claim 8, wherein said stored-program controlled processor means compares at least the direction drawn for each stroke drawn on the stroke-drawing surface of said input means and the display direction for each exemplary stroke presented on said display means.

10. The apparatus for providing instruction in stroke-forming skills of claim 9, wherein said stored-program controlled processor means compares at least the positions, relative to a fixed set of orthogonal coordinate axes of said input means, of each stroke drawn on the stroke-drawing surface of said input means and the position, relative to a fixed set of orthogonal coordinate axis of said display means, of each exemplary stroke presented on said display means.

11. The apparatus for providing instructions in stroke-forming skills of claim 10, wherein said stored-program controlled precessor means compares at least the size for each stroke drawn on the stroke-drawing surface of said input means and the size for each exemplary stroke presented on said display means.

12. An apparatus for providing instruction in stroke-forming skills, comprising:
   display means for displaying an exemplary stroke to a user;
   input means having a stroke-drawing surface for providing a digital data output representative of a stroke drawn by a user upon said stroke-drawing surface in response to said displayed exemplary stroke;
   mode selecting means for selecting one of a plurality of instruction modes including at least one instruction mode in which a succession of exemplary strokes defining a character are presented on a stroke-by-stroke basis to said user on said display means for emulation by said user on said stroke-drawing surface;
   memory means for storing digital representations of at least one exemplary stroke for display on said display means and for storing digital data provided by said input means representative of each stroke drawn on said stroke drawing surface in response to said displayed exemplary stroke; and
   stored-program controlled processor means for controlling said memory means and said display means in accordance with a mode selected by said mode selecting means to display each said exemplary stroke and for analyzing digital data of each corresponding stroke drawn on said stroke-drawing surface to identity segments constituting each drawn stroke and quantifying the deviation between the digital data representative of the segments constituting each drawn stroke and digital data representative of segments that constitute the corresponding exemplary stroke.

13. The apparatus for providing instruction in stroke-forming skills of claim 12, further comprising:
   sound generator means for providing an indication to the user of the deviation.

14. The apparatus for providing instruction in stroke-formning skills of claim 12, wherein digital data representative of segments constituting each exemplary stroke and each stroke drawn on said stroke-drawing surface are stored as a series of X,Y coordinate points.

15. The apparatus for providing instruction in stroke-forming skills of claim 12, wherein said stored-program controlled processor means displays each exemplary stroke by successively controlling discrete picture elements of said display means from a start point to an end point at a rate sufficiently slow to allow perception of the direction of each exemplary stroke.

16. The apparatus for providing instruction in stroke-forming skills of claim 12, wherein said stored-program controlled processor means compares at least the position of start coordinate points for each segment constituting each stroke drawn on the stroke-drawing surface of said input means and the position of start coordinate points for each segment of each exemplary stroke presented on said display means.

17. The apparatus for providing instruction in stroke-forming skills of claim 12, wherein said stored-program controlled processor means compares at least the position of end coordinate points for each segment constituting stroke drawn on the stroke-drawing surface of said input means and the position of end coordinate points for each segment of each exemplary stroke presented on said display means.

18. The apparatus for providing instruction in stoke-forming skills of claim 12, wherein said stored-program controlled processor means compares at least the orientation with respect to a fixed coordinate axis of each segment constituting each stroke drawn on the stroke-drawing surface of said input means and the orientation with respect to said fixed coordinate axis of each segment of each exemplary stroke presented on said display means.

19. The apparatus for providing instruction in stroke-forming skills of claim 12, wherein said stored-program controlled processor means compares at least the curvature for each stroke drawn on the stroke-drawing surface each of said input means and the curvature for each exemplary stroke presented on said display means.

20. The apparatus for providing instruction in stroke-forming skills of claim 12, wherein said stored-program controlled processor means compares at least the direction drawn for each segment constituting each stroke drawn on the stroke-drawing surface of said input means and the display direction for each segment of an exemplary stroke presented on said display means.

21. The apparatus for providing instruction in stroke-forming skills of claim 12, wherein said stored-program controlled processor means compares at least the position, relative to a fixed set of orthogonal coordinate axes of said input means, of each segment of each stroke drawn on the stroke-drawing surface of said input means and the position, relative to a fixed set of orthogonal coordinate axes of said display means, of each segment of each exemplary stroke on said display means.

22. The apparatus for providing instruction in stroke-forming skills of claim 12, wherein said stored-program controlled processor means compares at least the size of each segment constituting each stroke drawn on the stroke-drawing surface of said input means and the size of each segment of each exemplary stroke presented on said display means.

23. A method of providing instruction in stroke-forming skills, comprising the steps of:
   selecting one of a plurality of instruction modes including at least one instruction mode in which a succession of exemplary strokes defining a character are presented on a stroke-by-stroke basis to a user on a display device for emulation by the user;

displaying an exemplary stroke on said display device;

inputting a stroke on an input device in response to said displayed exemplary stroke;

digitizing the input stroke to obtain a set of digital data representative of the input stroke;

comparing the digital data representative of the input stroke to digital values representative of the displayed exemplary stroke to obtain a representation of the deviation between the displayed exemplary and input strokes;

deducting the deviation value from an ideal value to obtain a grade representative of the inputted stroke; and providing an indication of the obtained grade.

24. The method in accordance with claim 23, wherein said displaying step includes the step of displaying each exemplary stroke by successively controlling discrete picture elements of said display device from a start point to an end point at a rate sufficiently slow to allow perception of the direction of each exmplary stroke.

25. The method in accordance with claim 23, wherein said digitizing step includes the step of storing digital data representative of each exemplary stroke and each stroke input as a series of X, Y coordinate points.

26. The method in accordance with claim 25, wherein said comparing step includes the step of comparing at least the position of start coordinate points for each input stroke and the position of start coordinate points for each exemplary stroke presented on said display device.

27. The method in accordance with claim 25, wherein said comparing step includes the step of comparing at least the position of end coordinate points for each input stroke and the position of end coordinate points for each each exemplary stroke presented on said display device.

28. The method in accordance with claim 25, wherein said comparing step includes the step of comparing at least the orientation with respect to a fixed coordinate axis of each input stroke and the orientation with respect to said fixed coordinate axis of each exemplary stroke presented on said display device.

29. The method in accordance with claim 25, wherein said comparing step includes the step of comparing at least the curvature for each input stroke and the curvature for each exemplary stroke presented on said display device.

30. The method in accordance with claim 25, wherein said comparing step includes the step of comparing at least the direction drawn for each input stroke and the display direction for each exemplary stroke presented on said display device.

31. The method in accordance with claim 25, wherein said comparing step includes the step of comparing at least the position, relative to a fixed set of orthogonal coordinate axes of said input device, of each input stroke and the position, relative to a fixed set of orthogonal coordinate axes of said display device, of each exemplary stroke presented on said display device.

32. The method in accordance with claim 25, wherein said comparing step includes the step of comparing at least the size for each input stroke and the size for each exemplary stroke presented on said display device.

33. The method in accordance with claim 23, wherein said indication providing step includes the step of generating a sound indicating to the user the obtained grade.

34. The method in accordance with claim 23, wherein said mode selecting step includes the step of selecting one of at least three instruction modes including a first instruction mode in which a single exemplary stroke is presented to the user, a second instruction mode in which said succession of exemplary strokes defining a character are presented on a stroke-by-stroke basis to the user, and a third instruction mode in which a fully formed character is presented to the user for emulation.

* * * * *